Feb. 24, 1942.  J. W. DAMMERS  2,273,939
DEGREASING MACHINE
Filed Aug. 4, 1939  3 Sheets-Sheet 1

Inventor:
John W. Dammers
By Brown, Jackson, Boettcher & Dienner
Attys.

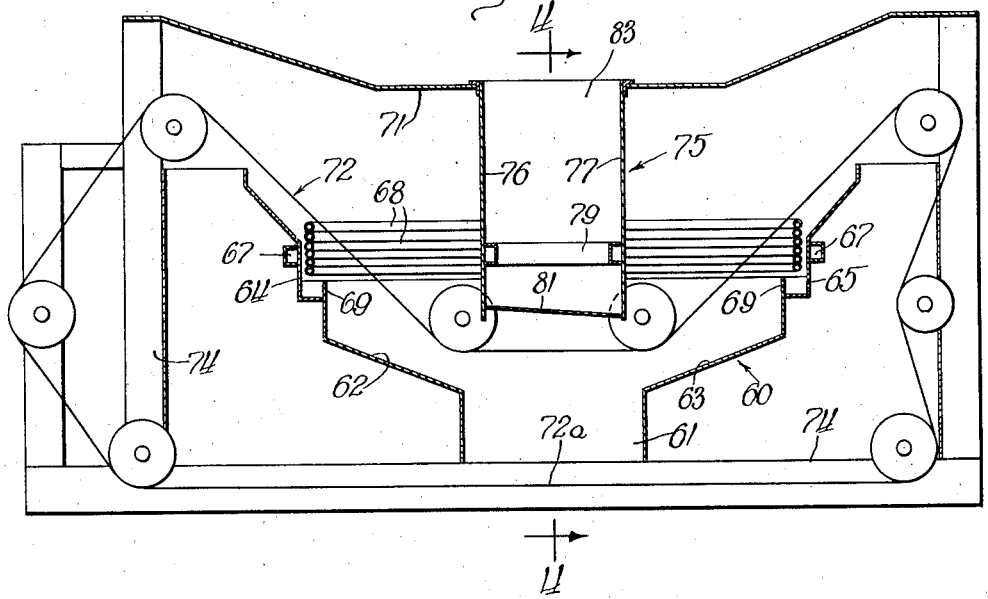

Feb. 24, 1942.　　J. W. DAMMERS　　2,273,939
DEGREASING MACHINE
Filed Aug. 4, 1939　　3 Sheets-Sheet 3

Inventor:
John W. Dammers
By Brown, Jackson, Boettcher & Dienner
Attys,

Patented Feb. 24, 1942

2,273,939

UNITED STATES PATENT OFFICE 2,273,939

DEGREASING MACHINE

John W. Dammers, Oak Park, Ill., assignor to G. S. Blakeslee & Co., Cicero, Ill., a corporation of Illinois Application August 4, 1939, Serial No. 288,299

14 Claims. (Cl. 202—170)

My invention relates generally to the control of vapors heavier than air in a container open to the atmosphere, and specifically, to the control of vapors in an apparatus used for the cleaning and degreasing of solids such as metals, glass, etc.

Such apparatus, commonly referred to as a "degreasing machine" employs solvents whose vapors are heavier than air, such as benzine, benzol, toluol, and chlorinated hydrocarbons like carbon tetrachloride, ethylene dichloride, trichlorethylene, and tetrachlorethylene. The apparatus itself consists of a tank, or a group of tanks, of one or multiple compartments, having heating means for boiling the liquid solvent to generate a vapor, and cooling means at a higher level for liquifying the vapors and thus preventing their escape to the atmosphere.

It is of general knowledge to those skilled in the art that the rate of evaporation or diffusion into the atmosphere, besides depending on the vapor pressure and the density of the fluid, is proportional directly to the horizontal surface area, the velocity of air over the surface area, and the amount of turbulence of the fluid surface. This is as true of vapors heavier than air as it is of liquids.

Heretofore, reliance for control of solvent vapors has been placed almost solely upon provision of some vapor liquefying means, such as cooling coils, manifolds, and the like which tend to set up a cooling zone, around the walls of the tank, effective for condensing pure solvent vapors tending to pass out of the machine. This means, although effective while operating on concentrated pure vapors, loses its efficacy when air is in admixture with the vapor. Furthermore, this means has no desirable effect on reducing the evaporative losses due to evaporative area, air velocity, or turbulence.

It is the express purpose of my invention to improve the control of solvent vapors, heavier than air, used in such cleaning apparatus with a novel construction, which, in its simplest form, is in the shape of a generally rectangular box, of suitable construction, mounted in the upper part of the cleaning machine and having a closed bottom which may extend from two to six inches into the concentrated vapor. This box construction reduces the effective evaporative area of the vapor, minimizes the air velocity over the surface area exposed to the atmosphere, eliminates air currents in the area covered by the box, and confines turbulence to the area covered by the box, and thus isolates effects of turbulence from the evaporative areas which are necessarily exposed to the atmosphere for the passage of work. In effect, this box construction eliminates evaporation from a vapor area equal to the area of the bottom of the box.

This box can be located in a manner to prevent currents through the cleaning machine, and placed in a region of turbulence, such as above sprays, so as to completely eliminate currents and turbulence, and consequently reduce the loss of solvent by evaporation. A number of such boxes can generally be employed to advantage in a single cleaning machine.

As a refinement, I may place a small channel, coil, or the like, around the perimeter of the box at the vapor level with cooling water circulating through it. The purpose of this is to check the conduction of heat up the walls of the box and thus prevent stack or convection loss of surrounding solvent vapor. "Stack" refers to the passage surrounded by cooling coils through which the work passes in its progress through the machine.

This box construction may be referred to as an anti-diffusion chamber.

Another form of this construction is an inverted box, that is, a chamber closed at the top and open at the bottom. As in the case of the previous form, it is mounted in the upper part of the cleaning machine with its sides extending from two to six inches below the vapor level. Vapor evaporating from the enclosed vapor area will pass into the enclosed space above and thus be trapped from the atmosphere. This arrangement has the advantage that sprays used for spraying the work may be under considerable pressure when directed into the enclosed area without imparting a turbulence to the surrounding vapor and without a loss of vapor due to condensation on the cooler liquid spray. In this form also, I prefer to provide cooling coils around the box at the vapor level to eliminate stack or convection losses.

In either of the forms, the anti-diffusion chamber may extend the entire width and make an integral part of the tank proper if so desired.

These and other objects and advantages of the present invention will be apparent to those skilled in the art after a consideration of the following detailed description, taken in conjunction with the accompanying drawings.

In the drawings:

Figure 3 is a longitudinal vertical section of a modified form of degreasing machine in which the present invention has been incorporated;

Figure 4 is a section taken along the line 4—4 of Figure 3;

Figure 1:
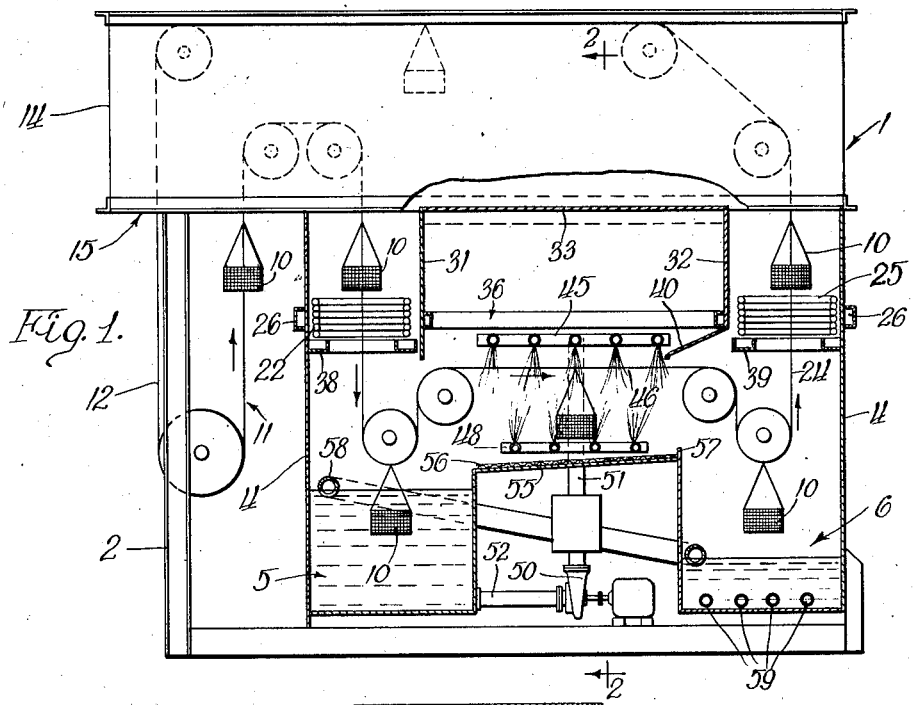
Figure 1 is a longitudinal vertical section taken through one form of degreasing machine in which the principles of the present invention have been embodied.
Figure 2:
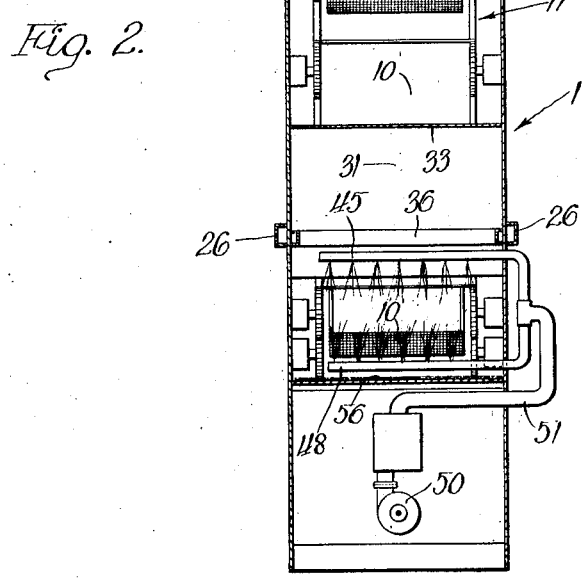
Figure 2 is a section taken generally along the line 2—2 of Figure 1.

Referring now more particularly to Figures 1 and 2, the reference numeral 1 indicates the degreasing machine as a whole, the machine consisting generally of a framework 2 consisting of bars, angles, and other structural members. The container for the solvent is indicated at 4 and consists of two sections 5 and 6, the former having a relatively high liquid level therein and serving as a liquid rinse and the latter having a relatively low liquid level therein and serving as a vapor rinse. The articles are supported in suitable baskets 10 which are carried to the machine on a conveyor 11 of any suitable construction operating over pulleys, sprockets, or the like. The section of the conveyor indicated at 12 is open to access to permit placing and/or removal of the article container baskets. The upper portion of the machine consists of a chamber 14 in which various sprockets for the conveyor 11 are carried, and preferably the chamber 14 is closed except for the portion, indicated at 15, which is open to accommodate movement of the conveyor and work baskets.

The conveyor 11 moves in the direction of the arrows, the portion 21 of the conveyor entering the solvent container 4 through a cooling coil 22. The portion of the conveyor leaving the solvent container 4 is indicated at 24, and this portion passes out of the machine through another cooling coil 25. The cooling coils 22 and 25, which may be interconnected, are disposed at about the same level in the upper portion of the machine. Through connections, not shown, water is supplied to the cooling coils, and also to a manifold 26 which surrounds the solvent container 4, either on the inside or outside of the walls, as desired. Preferably the manifold 26, which is called a "cold spot," is disposed on the outside of the machine, and the water that is forced into and through the cooling coils 22 and 25 flows first around the cold spot 26. The coils 22 and 25 and cold spot or manifold 26 may, of course, be supplied separately with cooling water, as desired. The cold spot 26 serves the purpose of preventing the transmission of heat up the walls of the solvent container 4, and the purpose of the cooling coils 22 and 25 is to condense any solvent vapors that tend to move out of the machine at these points.

Two spaced walls 31 and 32 extend across the tank or container 4 adjacent the upper portion, the walls 31 and 32 being connected across the top by a wall 33 which, with the sides of the container 4, form a box or anti-diffusion chamber. It will be noted that the walls 31 and 32 extend downwardly into the solvent container 4 to a point below the normal vapor line or level established by the cooling coils 22 and 25 and the cold spot manifold 26. The lower portions of the walls 31 and 32 and the associated side walls of the container 4 are provided with a second manifold or cold spot 36 which may be supplied with cooling water from any suitable source. The manifold 36 is disposed in the plane of the manifold or cold spot 26 about the outside of the container 4. Troughs 38 and 39 are disposed underneath the cooling coils 22 and 25 so as to catch condensates that drip from the cooling coils, and, if desired, the condensates from the troughs 38 and 39 may be conducted through suitable pipes to a water separator which separates from the condensed solvent any water that may have been condensed from atmospheric vapors by the cooling coils 22 and 25. It will be noted that the walls 31 and 32 extend below the normal vapor level, as defined by the cold spots 26 and 36, and that the wall 32 is provided with a skirt 40 which slopes downwardly and inwardly for a reason which will be referred to later.

Disposed between the lower portions of the walls 31 and 32 of the anti-diffusion chamber is an upper spray head 45 provided with a plurality of nozzles for directing liquid solvent onto articles which are carried past the spraying zone by the horizontal run 46 of the conveyor 11. A bottom spray head 48 is disposed below the conveyor run 46 and is also provided with a plurality of nozzles which spray the articles from underneath. The upper and lower nozzle heads 45 and 48 are supplied with liquid solvent by a pump 50 which discharges upwardly through a pipe 51 which connects to both the upper and lower spray heads. The pump draws liquid through an intake pipe 52 which extends from the pump 50 to the chamber 5. The lower spray head 48 is mounted just above a sloping deck or baffle 55 over which a screen 56 is disposed, and the inner wall of the other solvent chamber section 6 is extended upwardly, as at 57, so that all liquid from both the upper and lower sprays flows back into the chamber 5. An overflow pipe 58 extends from the upper portion of the chamber 5 downwardly to the chamber 6, and the latter may be provided with any suitable form of heating means, which may be a series of steam pipes 59 or any other source of heat, as desired.

The operation of the degreasing machine described above is substantially as follows:

The conveyor 11 operates in a direction of the arrows, and baskets containing the articles to be cleansed are attached to the conveyor in the usual manner and carried thereby through the machine. The work to be cleaned first enters through the cooling coil 22, this portion of the machine being termed an inlet stack, and the work is then carried down into the liquid in the chamber 5 and thoroughly rinsed. The work is then removed from the liquid rinse at 5 and carried between the upper and lower spray heads 45 and 48 on the horizontal run 46 of the conveyor. The sprays, by their physical and solvent action, remove practically all of the grease, wax, dirt and the like from the articles. The baffle 55 is located a short distance below the anti-diffusion chamber 31-32, forming therewith a restricted passage in the path of the articles through the machine. This restricted passage tends to minimize the turbulence of the vapors in the machine which is caused by the travel of the articles therethrough. The baffle 55 with the spray screen 56 thereon serves to prevent splattering of the sprayed liquid, particularly that from the upper sprays 45 which direct the solvent downwardly.

The action of the sprays 45 and 48 agitates the vapors within the container 4, but this agitation of the vapor is largely suppressed by the action of the anti-diffusion chamber 31, 32, whose walls carry the cooling means 36. The temperature of the walls is such that the vapors are cooled and condensed. This also serves to reduce convection currents, and the walls 31, 32 extend downwardly a distance below the normal vapor level so as to impede drafts which might circulate the vapor about and cause some of it to be lost upwardly through the cooling coils 22 and 25, even though their effect is to cool and condense the vapor and hence prevent its loss from the machine. The vapors that are condensed by the anti-diffusion chamber, particularly condensate that collects on the wall 32, are directed downwardly by the skirt 40 and caused to flow onto the articles after they have been sprayed. This condensate is pure distilled solvent.

After passing by the skirt 40, the articles are carried into the section 6 of the solvent container, and in this section the articles pass through a vapor rinse; they are not immersed at this point in their travel. From this point the articles are carried upwardly through the cooling coil 25, which serves as a part of the outlet stack of the machine, and so are carried back out of the machine through the opening at 15.

The provision of the anti-diffusion chamber makes it feasible to provide the lower spray 48, for the upper closed wall 33 prevents loss of vapor and the cooling means 36 quickly condenses all solvent vapor so that the same runs back over the articles and into the section 5 of the solvent container. The anti-diffusion chamber therefore appreciably reduces the turbulence due to the action of the sprays, particularly that disposed below the work.

A slightly different form of the present invention is illustrated in Figures 3 and 4. In this form of the invention the solvent container is indicated at 60, and is provided with a lower sump 61, sloping walls 62 and 63, and generally vertically arranged walls 64 and 65. The latter carries cooling means in the form of a manifold or cold spot 67 and one or more cooling coils 68. The latter are mounted above a set-back, and the wall extension 69 provides a trough underneath the cooling coils to catch any condensate dripping from the cooling coils 68.

The top wall 71 of the container is spaced from the vertical walls 64, 65 so as to receive conveyor means 72 which lead into the interior of the solvent container 60 and around underneath the same, as indicated at 72a. Preferably, the conveyor means, as described above, consists of suitable chains trained over cooperating sprockets, as is usual in this type of machine. The frame of the degreasing machine is indicated at 74 and supports the above mentioned parts in any suitable manner.

Depending from the upper wall section 71 is an anti-diffusion chamber 75 which consists of spaced apart walls 76 and 77 which extend downwardly from the upper wall 71 and extend entirely across the machine. The walls 76 and 77 at their lower ends are provided with a cooling manifold or cold spot 79, and immediately below the latter is a sloping wall 81 which seals off the interior of the anti-diffusion chamber 75 from communication with the interior of the solvent container 60. The walls 76 and 77 extend downwardly below the sloping wall 81.

Any suitable means is provided for directing a flow of cooling water or other medium through the cold spot 67, the cooling coils 68, and the anti-diffusion chamber cooling manifold 79. The cooling coils 68 and cold spot 67 serve to establish a normal vapor level within the solvent container 60, the anti-diffusion chamber cooling means 79 being disposed generally in the plane of said normal vapor level, with the walls 76 and 77 extending below the same. The action of the cooling water or other medium flowing through the manifold 79 is to cool the walls 76 and 77 which, in turn, serve to condense solvent vapors which collect in liquid form on the walls 76 and 77 and run down onto the articles to be cleaned as they pass around to the container 60. The sloping wall 81 serves to direct most of the solvent vapors condensed by the anti-diffusion chamber walls toward one end thereof, so that as the work passes this point it is rinsed with pure distilled solvent. The anti-diffusion chamber 75, being closed at the bottom and cooled, cooperates with the other cooling means to maintain the normal vapor level, prevent convection currents from carrying vapor out of the solvent container 60, and impede drafts which might also cause a loss of solvent vapor.

The anti-diffusion chamber 75 has side walls 83 and 84 (Figure 4), and the conveying means, particularly the sprockets for the conveyor, are disposed at least partially in the space between the ends or sides of the anti-diffusion chamber and the sides of the solvent container 60.

The degreasing machine shown in Figures 3 and 4, if desired, may be provided with sprays such as those shown in Figures 1 and 2, or the sprays may be eliminated and the articles cleaned by the vapor action. Any suitable means may be provided for heating the solvent in the container 60.

Figure 6:
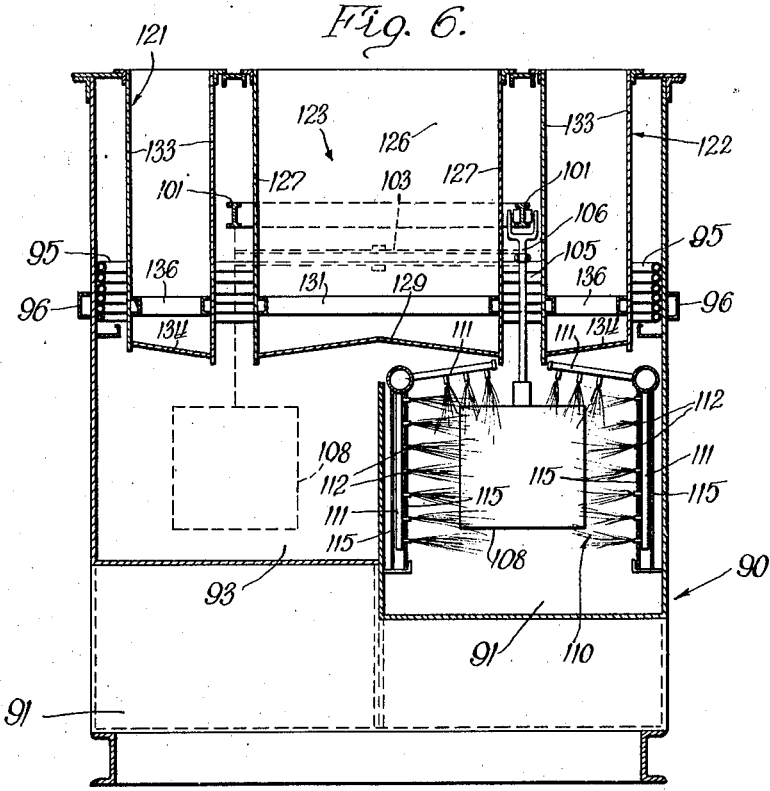
Figure 6 is a section taken along the line 6—6 of Figure 5.
Figure 5:
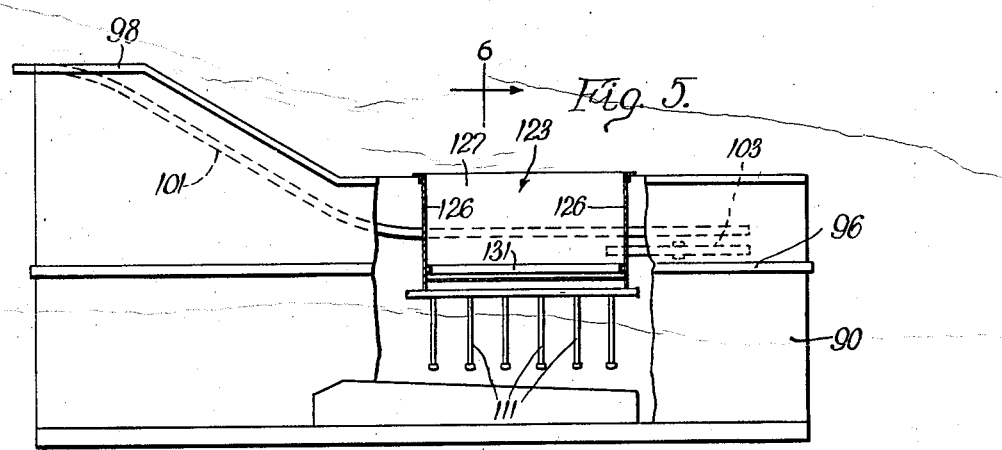
Figure 5 is another modified form of the present invention, showing a plurality of anti-diffusion chambers.

In the constructions described above, the solvent containers are shown as each provided with only one anti-diffusion chamber with cooling means at its lower portion for restricting the evaporative zone and limiting vapor losses due to drafts and convection currents, at the same time condensing some of the solvent vapors so as to rinse the work with pure distilled solvent as the work passes through the machine. If desired, the degreasing machine may be provided with a plurality of anti-diffusion chambers where feasible or required. Figures 5 and 6 illustrate such a construction.

In Figures 5 and 6 the solvent container is indicated by the reference numeral 90 and consists of a container section 91 serving as a sump for a pumping unit (not shown) and another container section 93 which is generally filled with solvent vapor. The container 90 is provided with the usual encircling cooling coils 95 disposed about the outer walls of the container and a manifold or cold spot 96, cooling water being directed to flow through both the cooling coils and the cold spot in generally the same manner as described above. At one end of the container 90 a hood or tunnel 98 is formed and is provided with conveyor track 101 which extends downwardly and forwardly into the main body of the container 90 at the opposite end of which is a traction wheel 103.

The work is supported by any suitable form of hanger means, such as is indicated in Figure 6 by the reference numeral 105, for travel along the track 101, one section of the track serving as an inlet and the other as an outlet. The hangers 105 are connected together by some form of traction chain or the like, as indicated at 106. The chain 106 travels around the traction wheel in the usual manner.

The work, indicated at 108, first passes through a spray area, indicated at 110, this portion of the solvent container 90 being provided with spray heads 111 which have nozzles 112, certain of the heads directing solvent downwardly, while the others about the sides of the spray area 110 direct the solvent jets against the work from opposite sides. Spray screens 115 are disposed at each side of the spray area 110 so as to prevent splattering of the solvent. The pump takes solvent from the sump 91 and forces the same through suitable nozzles through the sprays 111. The work then passes out of the spray area 110, around the traction wheel, and returns along the other track section, entering the vapor area 93, and then passes out of the machine.

Depending from the upper wall of the solvent container are three anti-diffusion chambers indicated at 121, 122 and 123. Each chamber has depending side and end walls which extend downwardly below the normal vapor level maintained by the cooling coils 95 and cold spot 96, and the lower portions of the anti-diffusion chambers are sealed off by sloping walls. The central anti-diffusion chamber 123 extends downwardly between the two track sections 101, and has side and end walls 126 and 127. The bottom wall 129 slopes in opposite directions from the center of the chamber and is connected to the lower portions of the walls 126 and 127 at points above the lower edges. The central anti-diffusion chamber is provided with a manifold or a cold spot 131. The side anti-diffusion chambers are of substantially the same construction. Each includes four walls 133 connected together at their lower portions by a sloping wall 134 which slopes downwardly and inwardly, and each side anti-diffusion chamber has its own cooling manifold or cold spot 136. It will be noted that the two track sections 101 are disposed in the space between the central anti-diffusion chamber 123 and the side chambers 121 and 122. By virtue of this construction, the anti-diffusion chamber cooling manifolds 131 and 136 are disposed in the same plane as the normal vapor level maintained in the machine, and the cooling effect of the lower portions of the anti-diffusion chambers condenses sufficient solvent vapor so that as the work passes along the conveyor track sections 101 the work receives a rinse of pure distilled solvent. Further, the anti-diffusion chambers, as in the modifications described above, restrict the diffusion of solvent vapor from one portion of the machine to the other, eliminate to a large extent convection currents through the machine, which might tend to carry some of the vapors out of the machine, and the anti-diffusion chambers also eliminate to a large extent turbulence within the machine due to the action of the sprays.

While I have shown and described the preferred means in which the principles of the present invention have been embodied, it is to be understood that my invention is not to be limited to the particular means shown and described above, but that, in fact, widely different means may be employed in the practice of the broader aspects of my invention.

What I claim, therefore, and desire to secure by Letters Patent, is:

1. In a degreasing machine, a container for solvent, a cold spot around the upper portion of the container, inlet and outlet passages, each having cooling coils disposed generally in the plane of said cold spot and cooperating therewith to form a normal vapor level in the container, a chamber in the form of a rectangular box structure formed integral with the machine positioned in the upper part thereof and extending below said vapor level and provided with cooling means disposed adjacent said level, conveyor means for moving articles to be cleaned underneath said chamber, and spray means underlying said chamber for directing a spray of solvent fluid onto the articles as they pass underneath said chamber.

2. A degreasing machine as defined in claim 1 in which said chamber is provided with a closed wall above said spray means.

3. Apparatus for cleaning and removing grease and the like from articles, comprising a solvent container having space for solvent vapor therein and means for passing articles to be cleaned through said space, generally horizontally arranged cooling means disposed adjacent the outside of said container and serving to establish a cooling zone which determines the vapor level within said container, said cooling means serving to condense the solvent vapors and prevent escape of the vapors from said container, a box extending into said space below the level of said cooling zone and having its lower end closed, and cooling means carried by the walls of said box generally in the plane of said first-mentioned cooling means and serving to restrict the extent of said vapor level and acting to condense solvent vapors, the bottom of said box sloping to one side to direct the condensate onto said articles as they pass through said space.

4. A degreasing machine comprising a container for a volatile solvent, cooling coils establishing a normal vapor level in said container for condensing any solvent vapors to prevent loss of solvent by providing an opening through which articles to be cleaned may be inserted into or removed from said container, spray means within said container for spraying said articles with solvent, and means for retarding diffusion of vapors within said container due to said spray means, comprising walls extending into the container to a point below said normal vapor level and covering the area affected by said spray means, said walls having channels formed thereon at a level with said normal vapor level for flow of a cooling medium therethrough in thermal conducting contact with said walls for cooling the same.

5. A degreasing machine comprising a container for solvent having a space in the upper portion for the reception of articles to be cleaned, cooling coils surrounding said space and establishing a normal vapor level and a vapor space below said vapor level to prevent loss of solvent through said space in the upper portion of the machine, and a chamber in the form of a rectangular box structure in the upper portion of the machine sealed at its lower end and extending below said normal vapor level and into said vapor space and serving to reduce the volume of said vapor space, said chamber having a channel formed thereon substantially at a level with said normal vapor level for flow of a cooling medium therethrough in thermal conducting contact with the walls of said chamber for cooling the same, said chamber being positioned with inlet and outlet passages between itself and the sides of the machine.

6. A degreasing machine comprising a solvent container having cooling means establishing a normal vapor level therein, conveyor means for passing articles to be cleaned into and out of said container, and a chamber including a pair of spaced vertically disposed cooled walls extending downwardly through said normal vapor level about said conveyor means, spray means disposed between said cooled walls for spraying solvent onto said articles passing underneath said walls, and one of said walls being provided with a sloping skirt for directing solvent vapors condensed by said one wall onto said articles after they have passed adjacent said spray means.

7. Cleaning apparatus comprising a container for a volatile solvent, cooling means disposed along the exterior portions of said container for condensing the solvent vapors and establishing a normal vapor level, article conveying means passing into said container along one side thereof and reversing its direction and passing along the other side of the container to a point exterior thereof, means for spraying liquid solvent onto said articles as they are moved by said conveying means along one side of said container, means establishing a vapor area through which said articles pass at the other side of the container, a wall dividing said last mentioned area from the portion of said container in which the articles are subjected to said spray means, and a plurality of chambers depending from the upper portions of said container and each having a closed lower bottom and cooling means disposed generally in the plane of said normal vapor level so that the lower portions of said plurality of chambers serve to condense vapors of the solvent over both of said areas, said chambers being spaced apart so as to receive said conveying means therebetween.

8. In a degreasing machine for degreasing articles in a solvent the vapor of which is heavier than air, a container for the solvent, cooling means for establishing a vapor level in said container, a chamber in the form of a rectangular box structure positioned in the upper part of the machine and extending down below said vapor level, said chamber covering the greater portion of the exposed area of said container and positioned with inlet and outlet passages between itself and the sides of the machine for the passage of articles to be degreased therethrough, said cooling means comprising channels on said container and chamber for flow of a cooling medium therethrough in thermal conducting contact with said container and chamber and cooling coils in said passages, all of said cooling means being at a level with one another.

9. In a degreasing machine, a container for solvent, cooling means for establishing a vapor level in said container, a chamber in the form of a rectangular box structure positioned in the upper part of the machine and extending down below said vapor level, said chamber positioned with inlet and outlet passages between itself and the sides of the machine for the passage of articles to be degreased therethrough, said cooling means comprising channels on said container and chamber for flow of a cooling medium therethrough in thermal conducting contact with said container and chamber and cooling coils in said passages, all of said cooling means being at a level with one another, means in proximity to said chamber for spraying the articles to be degreased, and means on said box structure for directing solvent condensed from the vapor on the articles to be degreased.

10. In a degreasing machine, a container for solvent, means for establishing a vapor level in said container, a chamber in the form of a rectangular box structure with an open bottom positioned in the upper part of the machine and extending down below said vapor level, said chamber positioned with inlet and outlet passages between itself and the sides of the machine for the passage of articles to be degreased therethrough, said means comprising cooling means in juxtaposition to the container, chamber, and passages, all of said cooling means being at a level with one another, and means in proximity to the open side of said chamber and remote from said passages for spraying the articles to be degreased.

11. In a degreasing machine, a container for solvent, means for establishing a vapor level in said container, a chamber in the form of a rectangular box structure with an open bottom mounted in the machine and extending down below said vapor level, said chamber positioned with inlet and outlet passages between itself and the sides of the machine for the passage of articles to be degreased therethrough, said means comprising cooling means in juxtaposition to the container, chamber, and passages, all of said cooling means being at a level with one another, baffle means defining a restricted passage along said open bottom of said chamber, spraying means underlying said chamber for spraying the articles to be degreased and directed toward said baffle, and means on said baffle for preventing diffusion of the solvent from said spraying means.

12. In a degreasing machine, a container for solvent divided into two compartments adapted to retain liquid solvent at different levels, cooling means for establishing a vapor level in said container to prevent the escape of vapors therethrough, a chamber in the form of a box structure with an open bottom mounted in the machine and extending down below said vapor level, baffle means defining a restricted passage along said open bottom of said chamber, spraying means in said restricted passage for spraying the articles to be degreased, said spraying means being directed toward said open bottom of said chamber and toward said baffle means, said baffle means sloping toward said compartment containing the higher level of solvent, means on said chamber for directing solvent condensed from the vapor onto the articles to be degreased and subsequently onto said baffle means, and means for conveying the articles to be degreased into the liquid solvent in the compartment containing the higher level of solvent, through the spray from said spraying means, and into the vapor in the compartment containing the lower level of solvent.

13. In a degreasing machine, a container for a solvent, a chamber in the form of a substantially rectangular box structure having upper and lower ends and side walls extending downward within said container and closed adjacent one end, said chamber defining with the side walls of said container inlet and outlet passageways for articles to be degreased, cooling coils in said passageways for maintaining therein a normal vapor level, conduits on said passageway walls substantially in the plane of said coils for circulation therethrough of a cooling medium in thermal conducting relation to said passageway walls effective for cooling them and thereby preventing flow upward therealong of convection currents, spray means underlying said chamber, and means for conveying articles to be degreased through said machine and subjecting them to the action of said spray means.

14. In a degreasing machine, a container for a solvent, a chamber in the form of a substantially rectangular box structure having upper and lower ends and side walls extending downward within said container and closed adjacent one end, a side wall of said chamber being spaced from a side wall of said container and defining therewith a passageway for articles to be degreased, a cooling coil in said passageway for maintaining therein a normal vapor level, conduits on said passageway walls substantially in the plane of said coil for circulation therethrough of a cooling medium in thermal conducting relation to said passageway walls effective for cooling them and thereby preventing flow upward therealong of convection currents, spray means underlying said chamber, and means for conveying articles to be degreased through said machine and subjecting them to the action of said spray means.

JOHN W. DAMMERS.